United States Patent [19]
McGregor

[11] Patent Number: 5,222,512
[45] Date of Patent: Jun. 29, 1993

[54] SPARGER SYSTEM FOR DISCHARGE OF BULK MATERIAL FROM HOPPER CARS

[75] Inventor: Colin R. McGregor, Oakville, Canada

[73] Assignee: Tenneco Canada Inc., Islington, Canada

[21] Appl. No.: 834,766

[22] Filed: Feb. 13, 1992

Related U.S. Application Data

[63] Continuation of Ser. No. 671,474, Mar. 19, 1991, Pat. No. 5,110,366, which is a continuation-in-part of Ser. No. 205,726, Jun. 13, 1988, Pat. No. 5,002,615.

[51] Int. Cl.⁵ .......................... B08B 3/02; B08B 9/08
[52] U.S. Cl. .................................................. 134/166 R
[58] Field of Search ............... 239/548, 550, 556, 557, 239/589, 662, 112; 406/48, 136, 137, 194; 422/278, 279; 423/658 S; 134/166 R, 169 R, 172, 22.11, 22.12, 22.18, 23, 24, 32, 34; 105/247; 366/107; 261/122, 124

[56] References Cited

U.S. PATENT DOCUMENTS

| | | | |
|---|---|---|---|
| 240,831 | 5/1881 | MacFarlane | 261/124 |
| 1,686,335 | 10/1928 | Messler et al. | 134/169 R |
| 2,653,116 | 9/1953 | Whitcomb et al. | 134/34 |
| 3,182,669 | 5/1965 | Campbell et al. | 134/24 |
| 3,360,301 | 12/1967 | Donaho, Jr. | 406/136 |
| 3,512,842 | 5/1970 | Milewski et al. | 406/136 |
| 3,649,007 | 2/1972 | Dare et al. | 105/247 |
| 3,684,457 | 8/1972 | Pinto et al. | 422/278 |
| 3,693,839 | 9/1972 | Shaver et al. | 222/195 |
| 3,733,056 | 5/1973 | Fong | 366/107 |
| 3,827,634 | 8/1974 | Hammelmann | 239/548 |
| 3,860,018 | 1/1975 | Reiter | 134/166 R |
| 3,930,685 | 1/1976 | Milliken | 406/136 |
| 4,044,951 | 8/1977 | Waite | 134/172 |
| 4,140,543 | 2/1979 | Soleri et al. | 134/23 |
| 4,160,618 | 7/1979 | Sensibar | 239/589 |
| 4,189,262 | 2/1980 | Anderson | 406/136 |
| 4,326,810 | 4/1982 | Schofield et al. | 366/107 |
| 4,443,551 | 4/1984 | Lionetti et al. | 422/143 |
| 4,459,919 | 5/1984 | Cole et al. | 134/166 R |
| 4,530,131 | 7/1985 | Zell et al. | 134/166 R |
| 4,603,661 | 8/1986 | Nelson et al. | 134/172 |
| 4,711,259 | 12/1987 | Martin, Jr. et al. | 134/166 R |
| 4,830,546 | 5/1989 | Witham et al. | 105/247 |
| 5,002,615 | 3/1991 | McGregor | 134/22.11 |

FOREIGN PATENT DOCUMENTS

| | | | |
|---|---|---|---|
| 951359 | 7/1974 | Canada | 423/658.5 |
| 504201 | 4/1920 | France | 239/556 |

*Primary Examiner*—Philip R. Coe
*Attorney, Agent, or Firm*—Sim & McBurney

[57] ABSTRACT

A sparger system for removing sodium chlorate crystal and other crystalline particulate material in slurry form from a tank car comprises a plurality of spray nozzles from which water is expelled as a flat spray initially to dissolve sodium chlorate so as to cavitate the mass of sodium chlorate crystals, which break off in lumps into the cavity and then to impact the walls and roof of the tank car to flush off residual sodium chlorate crystal. The slurry is collected in a sump and is discharged therefrom, with additional sprays agitating the sump to break up clumps of sodium chlorate and to maintain the particulates in suspension.

2 Claims, 3 Drawing Sheets

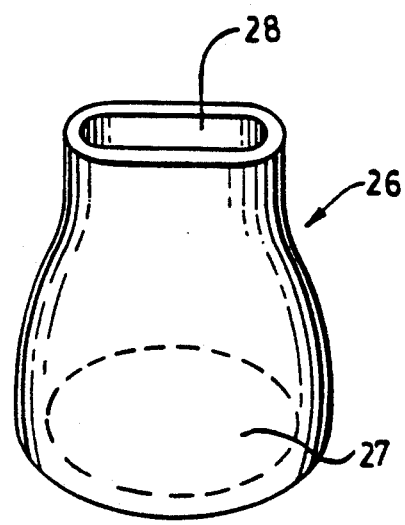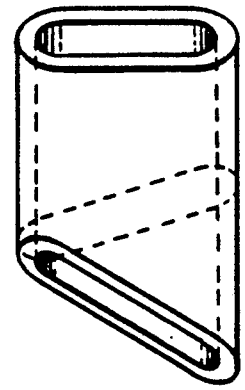
FIG. 6A.　　　　　FIG. 6B.
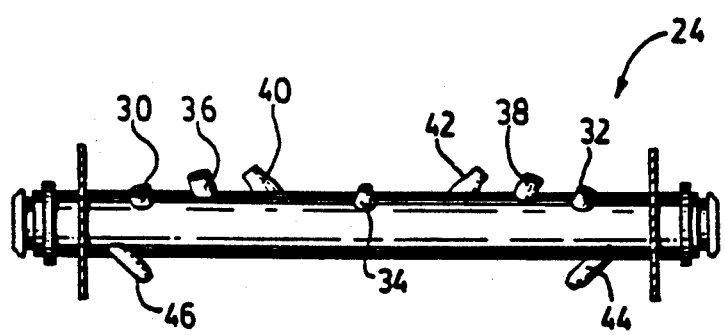
FIG. 4.
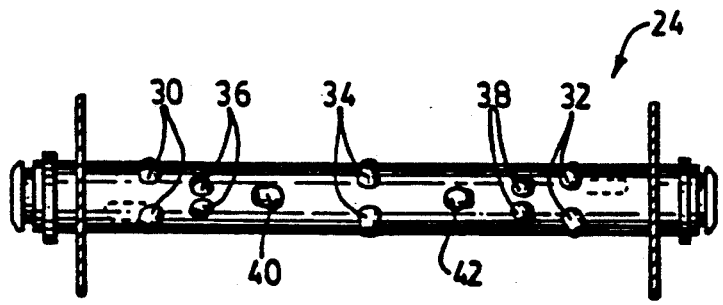
FIG. 5.

5,222,512

SPARGER SYSTEM FOR DISCHARGE OF BULK MATERIAL FROM HOPPER CARS

REFERENCE TO RELATED APPLICATION

This is a continuation of application Ser. No. 671,474 filed Mar. 19, 1991, now U.S. Pat. No. 5,110,366 which application is a continuation-in-part of copending U.S. patent application Ser. No. 205,726 filed Jun. 13, 1988, now U.S. Pat. No. 5,002,615.

FIELD OF INVENTION

The present invention relates to a sparger system for effecting the discharge of bulk material from rail hopper cars as a slurry.

BACKGROUND TO THE INVENTION

It is conventional to discharge particulate or bulk material from rail hopper cars by introducing a carrier liquid, usually water, into the car so as to form a slurry, which then is removed from the car through conduit pipes from a sump in the bottom portion thereof. This slurry unloading procedure preferably is used with materials which are at least partially soluble in the carrier liquid. However, slurry unloading can be used with insoluble particulate materials which are also capable of slurry formation, if a sufficient throughput of carrier liquid is used. When the method is used for soluble materials, including sodium chlorate, it is preferred to use insufficient carrier liquid to dissolve the material, but merely sufficient to form a pumpable slurry, so as to decrease the discharge time and minimize solvent use.

Sodium chlorate is shipped in crystalline form with some residual moisture. During shipping, the sodium chlorate tends to become a hard, almost concrete-like mass in the rail car, as residual moisture is driven off in summer heat or frozen in winter cold. This physical form of the sodium chlorate makes difficult the offloading of the sodium chlorate from the rail car.

Conventional hopper cars for slurry unloading generally have used nozzles mounted in the side walls of the hopper compartment, from which streams of liquid are passed into the car for turbulent admixture with the material to be unloaded. However, formation of the slurry has been found to be uneven. In the slurry formation, a portion of the particulate matter close to the nozzles dissolves and forms a true solution, this solution then forms a hollowed-out portion in the body of the particulate matter and other particulate matter from above collapses into the solution forming a slurry.

Canadian Pat. No. 951,359 describes a nozzle arrangement for a hopper car in which the nozzles are arranged to direct streams of liquid which impinge in an upward direction against the junction between a side wall and an end wall of the commodity-carrying compartment. This arrangement is intended to form a flow pattern in which liquid passes along the walls and tends to separate the particulate matter from the walls, so as to form a slurry in rapid and convenient manner. In addition, directing the liquid streams against the wall junctions is intended to cause the streams to spread along the walls and clean them.

Hopper cars constructed in accordance with Canadian Pat. No. 951,359 are in commercial use and have been used by the assignee of this patent application in the delivery of sodium chlorate to its customers at various locations in North America. Although these hopper cars have been found to be an improvement on previous hopper cars, the sparger system employed still leaves residual caked-on masses of sodium chlorate which must be removed, typically using steam lances.

In addition, the sparger nozzles are prone to damage and breakage as a result of impact of lumps of the solid sodium chlorate during slurry formation. The presence of broken-off nozzles in the slurry is a danger to pumps used by the mill to off-load the slurry to storage and the remaining opening in the sparger emits a non-directional spray which is ineffective in effecting slurry formation.

SUMMARY OF INVENTION

In accordance with the present invention, the prior art problems have been eliminated by employing a novel sparger system which rapidly and effectively removes all the sodium chlorate or other water-soluble crystalline particulate material from the hopper car, thereby eliminating the necessity for using steam lances to remove residual encrusted particulate material, and a novel nozzle design, thereby eliminating the nozzle damage and break-off problem.

Accordingly, in one aspect, the present invention provides a method of removal of water-soluble crystalline particulate material from an enclosure having side walls upwardly and outwardly extending from lower sump means, end walls upwardly and outwardly extending from the lower sump means and joined to the side walls, and a top wall, which comprises spraying the water from a plurality of orifices in a sparger pipe extending between the side walls in the form of a plurality of sprays each directed towards an extremity of the side walls adjacent to but not into the joint to the end walls, so that each the spray, after penetrating the particulate material in the enclosure, impacts the respective side wall and flushes through the joint with the respective end wall and partially across the respective end wall, and discharging from the sump an aqueous slurry of the particulate material formed in the sump as a result of the spraying step.

Although the present invention is described particularly with reference to the discharge of sodium chlorate crystal in slurry form from railway hopper cars, it will be apparent that the present invention is applicable to removal of any soluble crystalline material from any enclosed environment. For example, the present invention may be used for off-loading crystalline sodium chlorite from a hopper car.

BRIEF DESCRIPTION OF DRAWINGS

FIG. 4 is a side view of the sparger system used in FIG. 1;

FIG. 5 is a plan view of the sparger system of FIG. 4; and

FIGS. 6A and 6B are perspective close-ups of two embodiments of a nozzle used with the sparger system of FIG. 4.

DESCRIPTION OF PREFERRED EMBODIMENTS

Figure 1:
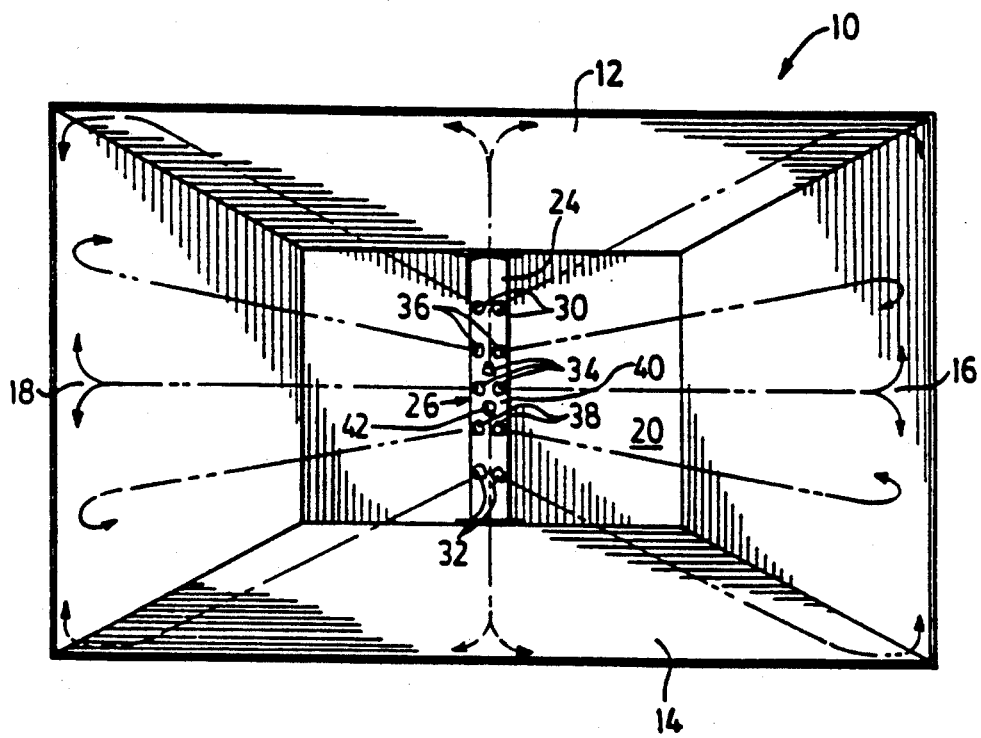
FIG. 1 is a plan view of a railway hopper car provided with a novel sparger system constructed in accordance with one embodiment of the invention.
Figure 2:
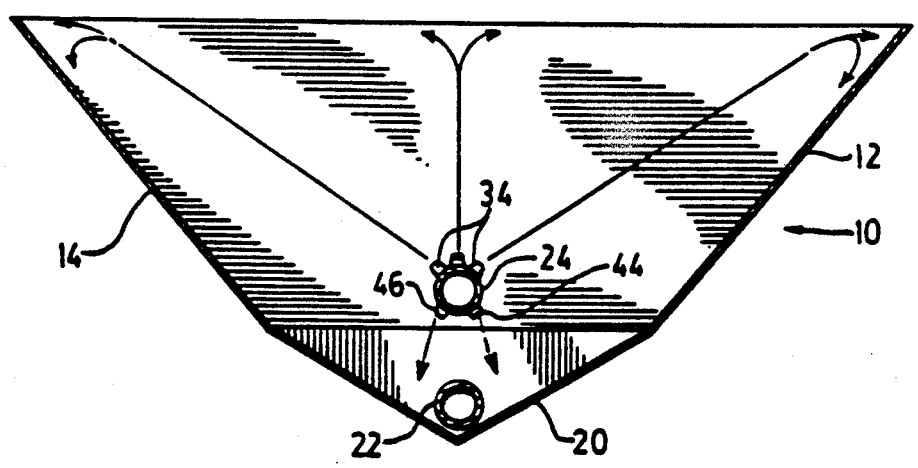
FIG. 2 is a side view of the hopper car and sparger system of FIG. 1.

Referring to the drawings, a railway car 10 has side walls 12, 14 and end walls 16, 18 which slope downwardly to a sump 20 to which is attached a discharge pipe 22 through which a sodium chlorate slurry is discharged from the sump 20. A sparger tube 24 is positioned transversely to the railway car 10 between and extending through and attached to the side walls 12 and 14 just above the sump 20. The sparger tube 24 is connected to a source of water at one end while being closed at the other. The sparger tube 24 has a plurality of nozzles 26 extending from its upper and also its lower surface arranged to direct the water outwardly from the sparger tube 24 in a predetermined manner, as described in more detail below. The sparger tube 24 and the nozzles 26 may be formed of any convenient material of construction, preferably aluminum.

The various nozzles 26 have a compact shape and are welded to the sparger tube 24. The compact shape enables the nozzles 26 to resist damage by falling clumps of sodium chlorate. The nozzles (see FIG. 6A) each is formed with a circular inlet orifice 27 and is shaped to provide an elongate outlet orifice 28 to form a fan-shaped jet of water emanating therefrom. Alternatively, each nozzle (see FIG. 6B) is formed with a uniform dimension throughout its length with an elongate passageway extending from an elongate inlet orifice 27 to an elongate outlet orifice 28. The fan-shaped jet provides a good cutting action through the mass of sodium chlorate and works its way through the compacted mass of crystal chlorate, causing the sodium chlorate to collapse towards the sump 20 for removal as a slurry through pipe 22. The sodium chlorate also may be removed as a solution by the utilization of greater quantities of water, which tends to increase the discharge time and hence is less preferred.

The nozzles 26 are positioned on the sparger tube so that they complement each other in their action by cutting, undermining, flushing, directing and molding the sodium chlorate crystal in suspension, as well as completing the unloading process by washing the hopper car clean of material, thereby avoiding the necessity for operators to enter the hopper car to clean off residual material.

Figure 3:
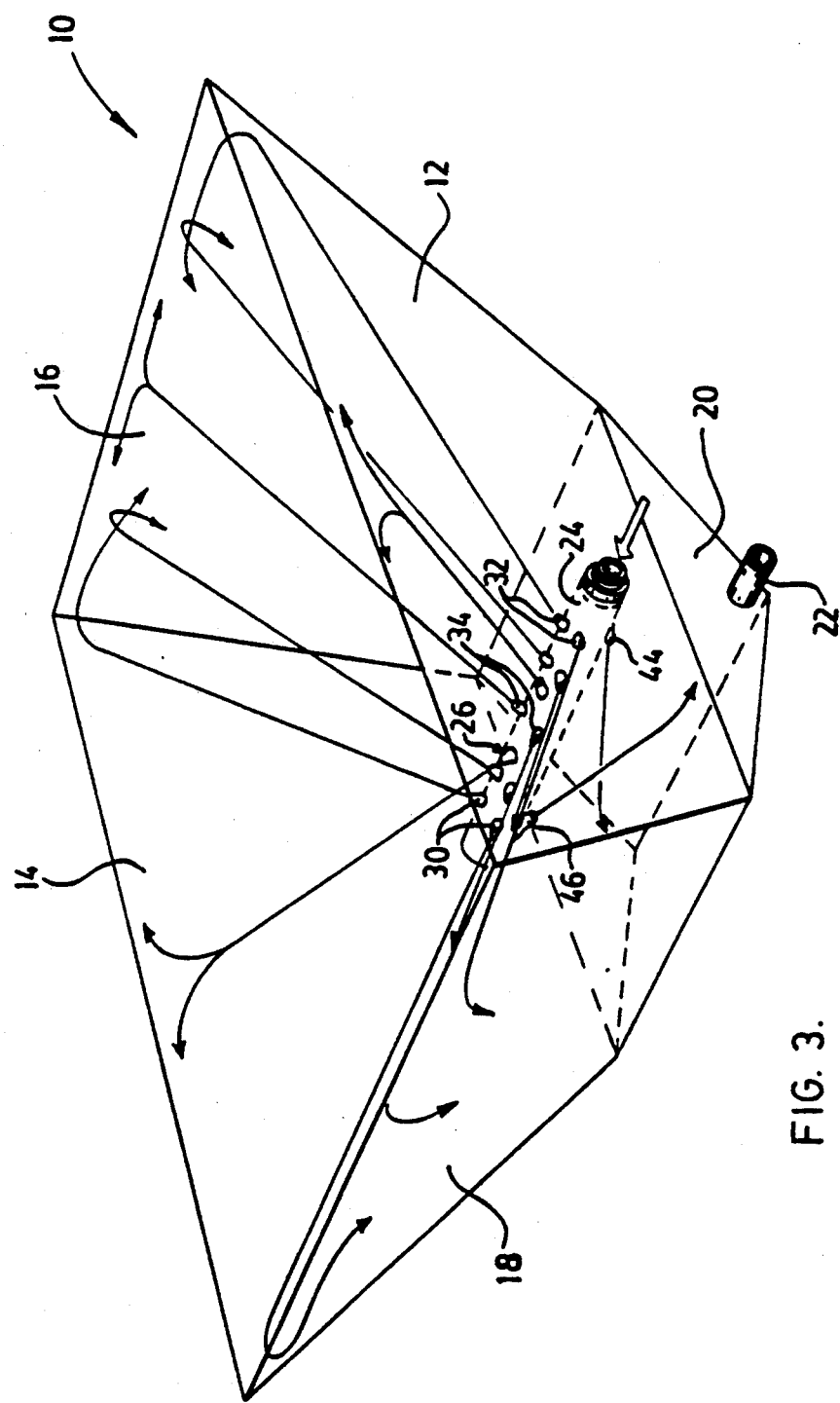
FIG. 3 is a perspective view of the hopper car and sparger system of FIG. 1.

The nozzles 26 are provided in complementary groups to achieve specific cutting and washing actions, as set forth below. The two end pairs 30, 32 are directed upwards towards the corner of the side plates 12, 14 with the end plates 16, 18. As may be seen from the spray paths illustrated in FIGS. 1 and 3, the sprays from the nozzle pairs 30 and 32 are directed towards and, after breaking through the sodium chlorate crystal, impact the side walls adjacent the corner with the end walls and not actually in the corner as required in Canadian Pat. No. 951,359. By impacting on the side wall adjacent the corner, the spray directs across the face of the end walls 16, 18, flushing particulates down the respective end wall in a much more efficient manner than is achieved with the structure of Canadian Patent No. 951,359.

Although the arrangement of nozzles 30, 32 and their location of impact is an improvement upon that described in Canadian Pat. No. 951,359 in terms of the efficiency of removal of residual particulates, it is preferred to use additional nozzles 26 to obtain complete washing out of the railway car 10, as further described below.

Nozzles 34 are centrally located along the length of the sparger pipe 24 and are directed upwardly towards the end plates 16, 18 so that, after breaking through the sodium chlorate crystal, the sprays from the nozzles 34 impact the end plates and flush upwardly and outwardly towards the junctions of the end plates 16, 18 with the side walls 12, 14, thereby washing particulates down the corners of the sloping end plates 16, 18 into the sump 20.

Additional pairs of nozzles 36, 38 are provided one pair located between the central nozzles 34 and each of the end pairs 30, 32 respectively. These nozzle pairs 36, 38 direct sprays upwardly so that, after breaking through the sodium chlorate crystals, the sprays from the nozzle pairs 36, 38 impact with the roof of the hopper car, splashing outwards against the end walls 16, 18 and then downwardly and outwardly, flushing particulates down the sloping end walls 16, 18, into the sump 20.

The spray system for slurry formation also has two additional nozzles 40, 42 which are directed upward and outward towards the side walls 12, 14 so that, after breaking through the sodium chlorate crystal, the sprays from the nozzles 40, 42 impinge on the side walls 12, 14 at their upper mid-section to splash upwardly and outwardly to flush particulates from those regions into the sump 20.

In operating the sparger system of the present invention, the slurry medium, namely water, is generally employed at a temperature of about 3° to about 97° C., preferably about 40° to about 85° C. The water is sprayed from each of the nozzles of the sparger system generally at the same pressure, usually about 5 to about 100 psi, preferably about 12 to about 40 psi.

The various spray nozzles 30, 32, 34, 36, 38, 40 and 42 of the sparger system, therefore, are targeted at specific areas of the side walls, end walls and roof of the hopper car 10, so that, after the initial cavity formation by the sprays and cutting through to the walls and roof, all portions of the walls and roof are flushed with water to remove particulates thoroughly from the interior of the hopper car.

In this way, all the sodium chlorate crystal is removed by slurrying water and the necessity to enter the hopper car and manually remove residual particulates from the walls is avoided.

To prevent lumps of sodium chlorate crystal from plugging discharge lines and the associated pump problems, a further pair of nozzles 44 and 46 are provided arranged to spray downwardly and inwardly but offset from one another, so that the resulting fan of water causes turbulence in the sump 20, thereby holding particulates in suspension and tending to break up lumps of sodium chlorate crystal which may be present in the sump, as well as directing the material towards the discharge pipe 22.

The sparger system of the present invention overcomes the various prior art problems discussed above. By using a compact structure, damage to and break-off of nozzles is prevented or at least minimized. Clumps of sodium chlorate in the discharge are eliminated and the whole contents of the hopper car are slurried and discharged, avoiding the necessity to conduct a clean-out of the car. The discharge of a typical hopper car load (100,000 kg) of sodium chlorate is complete in about 40 to 45 minutes using the preferred sparger system shown in FIGS. 1 to 6, in contrast to about 1½ to 2 hours for the conventional hopper car constructed as described in Canadian Pat. No. 951,359.

SUMMARY OF DISCLOSURE

In summary of this disclosure, the present invention provides a novel sparger system for removing crystalline material, particularly crystal sodium chlorate, from hopper cars transporting the same from the manufacturing location to the end use location, in a highly efficient and rapid manner. Modifications are possible within the scope of this invention.

What I claim is:

1. A sparger for use in a railway hopper car for transportation of a mass of particulate material, which comprises:
   an elongate header pipe having a longitudinal axis and a plurality of orifices in said header pipe for discharge of liquid therefrom and arranged in a predetermined pattern of sprays of liquid in specific directions for the discharge of the particulate material from the railway hopper car, including:
   a first pair of orifices provided adjacent one longitudinal end of said header pipe and arranged to form a first divergent pair of sprays directed towards said one end,
   a second pair of orifices provided adjacent the opposite longitudinal end of said header pipe and arranged to form a second divergent pair of sprays directed towards said opposite end, said second pair of orifices being aligned with the first pair of orifices parallel to the longitudinal axis of said header pipe,
   a third pair of orifices located adjacent the central portion of the length of said header pipe and arranged to form a third divergent pair of sprays directed away from said header pipe,
   a fourth pair of orifices located one on either longitudinal side of the third pair of orifices and arranged to form a fourth divergent pair of sprays directed one towards said one longitudinal end and the other towards said opposite longitudinal end,
   a fifth pair of orifices located between said first pair of orifices and said third pair of orifices and arranged to form a fifth divergent pair of sprays directed away from said header pipe,
   a sixth pair of orifices located between said second pair of orifices and said third pair of orifices and arranged to form a sixth divergent pair of sprays directed away from said header pipe, and
   a seventh pair of orifices located one adjacent each end of said header pipe on the opposite side of said header pipe from said first and second pair of orifices and arranged to form a pair of sprays directed towards each other in angularly-offset manner.

2. A sparger of claim 1 wherein each of said plurality of orifices comprises a nozzle of compact shape having a generally circular opening at its upstream end and a generally elongate opening at its downstream end to provide flat compact sprays from said nozzle.

* * * * *